United States Patent
Traversa et al.

(10) Patent No.: US 10,458,566 B2
(45) Date of Patent: Oct. 29, 2019

(54) METHOD FOR SIMULATING EXTREME OR DEFECTIVE SOLENOID VALVES FOR DEMONSTRATING THE FAILURE EFFECT AND FOR DETECTING FAULTS IN ORDER TO CERTIFY A VEHICLE DIAGNOSIS SYSTEM

(71) Applicant: Schaeffler Technologies AG & Co. KG, Herzogenaurach (DE)

(72) Inventors: Piergiacomo Traversa, Nuremberg (DE); Gerulf Pedersen, Furth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 191 days.

(21) Appl. No.: 15/548,297

(22) PCT Filed: Jan. 26, 2016

(86) PCT No.: PCT/DE2016/200035
§ 371 (c)(1),
(2) Date: Aug. 2, 2017

(87) PCT Pub. No.: WO2016/123709
PCT Pub. Date: Sep. 1, 2016

(65) Prior Publication Data
US 2018/0023720 A1    Jan. 25, 2018

(30) Foreign Application Priority Data
Feb. 26, 2015 (DE) .......... 10 2015 203 415

(51) Int. Cl.
G01M 15/02 (2006.01)
F16K 31/06 (2006.01)
(Continued)

(52) U.S. Cl.
CPC ............ *F16K 31/06* (2013.01); *F02B 77/082* (2013.01); *F02D 41/20* (2013.01); *F02D 41/221* (2013.01);
(Continued)

(58) Field of Classification Search
USPC .............................. 73/114.77, 118.01, 118.02
See application file for complete search history.

(56) References Cited

U.S. PATENT DOCUMENTS

| 2008/0148831 A1 | 6/2008 | Kekedjian et al. |
| 2010/0193036 A1 | 8/2010 | Haggenmiller et al. |

(Continued)

FOREIGN PATENT DOCUMENTS

| CN | 101315836 | 12/2008 |
| CN | 101809269 | 8/2010 |

(Continued)

*Primary Examiner* — Eric S. McCall
(74) *Attorney, Agent, or Firm* — Volpe and Koenig, P.C.

(57) ABSTRACT

A method for simulating malfunctioning solenoid valves is disclosed. A current flows through a solenoid valve in order to achieve opening and closing. The closing is forced after the current supplied to the solenoid valve is activated at an activation time, and the opening is forced after the current is deactivated. The current is applied with a charging current strength before activation for a charging phase, and after activation, the current is increased to peak current strength and subsequently reduced to a holding current strength. The current strength is reduced to a deactivation current strength, after which the current strength increases again. A variation of the value or duration of the current strength or an application of an additional magnetic force is used to simulate a premature activation, a delayed activation, a premature deactivation, or a delayed deactivation.

10 Claims, 2 Drawing Sheets

(51) Int. Cl.
  *F02M 51/06* (2006.01)
  *F02D 41/20* (2006.01)
  *F02D 41/22* (2006.01)
  *F02M 65/00* (2006.01)
  *F02B 77/08* (2006.01)

(52) U.S. Cl.
  CPC ........ *F02M 51/0621* (2013.01); *F02M 65/00* (2013.01); *F02D 2041/2017* (2013.01); *F02D 2041/2034* (2013.01); *F02D 2041/2044* (2013.01); *F02D 2041/2055* (2013.01); *F02D 2041/2058* (2013.01); *Y02T 10/40* (2013.01)

(56) References Cited

U.S. PATENT DOCUMENTS

2013/0284131 A1* 10/2013 Traversa .................. F01L 9/04
                                                                 123/90.11
2018/0268978 A1*  9/2018 Wang ................ G01R 31/3278

FOREIGN PATENT DOCUMENTS

| CN | 101892930     | 11/2010 |
|----|---------------|---------|
| CN | 102297065     | 12/2011 |
| CN | 102360707     | 2/2012  |
| CN | 202194730     | 4/2012  |
| DE | 102005062558  | 6/2007  |
| DE | 102008004078  | 7/2009  |
| DE | 102012213399  | 2/2014  |
| JP | 2002081340    | 3/2002  |

\* cited by examiner

METHOD FOR SIMULATING EXTREME OR DEFECTIVE SOLENOID VALVES FOR DEMONSTRATING THE FAILURE EFFECT AND FOR DETECTING FAULTS IN ORDER TO CERTIFY A VEHICLE DIAGNOSIS SYSTEM

BACKGROUND

The present invention relates to a method for simulating "malfunctioning" solenoid valves for an internal combustion engine by influencing the activation and/or deactivation times of the solenoid valve, wherein the solenoid valve is powered/energized with current of a predetermined, variable current strength for realizing opening and closing processes, wherein the closing or opening process is forced after activating the current feed to the solenoid valve at the activation point in time, and the opening or closing process is forced after deactivating the current feed to the solenoid valve at the deactivation point in time.

A "malfunctioning" solenoid valve is understood to be a solenoid valve that opens too early and/or too late and/or that closes too early and/or too late. For the case that the solenoid valve closes or opens too early and/or too late, this means that the solenoid valve is activated at an advanced and/or retarded point in time. An advanced/retarded activation thus defines a shortened/lengthened activation time. For the case that the solenoid valve opens or closes too early and/or too late, this means that the solenoid valve is deactivated at an advanced and/or retarded point in time. This means that the deactivation time is shortened or lengthened in this case.

The demonstration of failure effects and fault detection for certifying a vehicle diagnostics system, especially for CARB (California Air Resources Board) certification/release is necessary to be able to show that the system can detect defective components that might possibly influence emissions before these emissions reach a critical value. For this purpose, modified, "malfunctioning" solenoid valves, manufactured as extra components, are currently used.

This has the disadvantage that this procedure causes high costs and high complexity in production. In addition, the development times for such intentionally malfunctioning modifications of solenoid valve are very long and the distribution or transport of modified solenoid valves between the individual development locations is logistically very complex. In addition, the modified solenoid valves can be affected by wear and other problems and their properties can change due to use or long storage times. The limits up to which the system to be calibrated detects faults are based on the modified solenoid valves, wherein the control software is limited in its "capability." In particular, defects that involve a shifting of the switching times of the solenoid valves should be detected.

Switching valves and methods for controlling solenoid or switching valves are known from, among other publications, DE 10 2012 213 399 A1. That document describes a method for regulating a switching process of electromagnetically actuated switching valves for the exact control of valves under consideration of temperature oscillations and other interference sources. In addition, in the not yet published DE 10 2014 202 428.5, an electrohydraulic switching valve and a method for low-noise control of such a switching valve are described.

A conventional solenoid valve is formed essentially from a poppet that is arranged immovable in the axial and radial directions relative to a slide. In addition, it includes a magnetic armature, a primary coil that is connected to an electrical connection, and an upper spring and a lower spring that cause, among other things, the movement of the slide and poppet.

Here, the solenoid valve is held closed due to the higher spring force in the lower or dominant spring in comparison to the upper or non-dominant spring. By feeding a sufficient current into the coil, the sum of the forces from the non-dominant spring force and the magnetic force generated by the current flowing through the primary coil becomes greater than the spring force of the dominant spring, whereby the slide and the poppet are moved and the solenoid valve is closed or opened. If the current is cut or the current strength is reduced so much that the spring force of the dominant spring becomes greater than the sum of the spring force of the non-dominant spring and the magnetic force, the slide and poppet move and the solenoid valve is opened or closed again.

There is also the possibility that the solenoid valves are formed with the reverse function, that is, the solenoid valve is held closed or open by the dominant spring, the valve is opened or closed by the current feed, and it is closed or opened again by cutting the current, whereby the variations explained below can also be realized in the opposite sense.

SUMMARY

The object of the invention is to be able to influence the switching times, that is, the activation time and the deactivation time, of a conventional solenoid valve, so that these can be artificially lengthened and shortened; and to drastically reduce the costs, the complexity, and the development time for calibrating the system of solenoid valves being used; as well as simplifying the logistics for distributing these solenoid valves.

This object of the invention is achieved in that, before the activation point in time, the current with a charging current strength is applied for the duration of a charging phase/charging period and starting from the activation point in time, the current is increased to a peak current strength and is then reduced to a holding current strength, wherein starting from the deactivation point in time, the current strength is reduced to a deactivation current strength, wherein after a time offset, the current strength rises again due to inductance, wherein a variation of the magnitude and/or duration of a current strength and/or an application of an additional magnetic force is used for simulating an advanced activation, a retarded activation, an advanced deactivation, and/or a retarded deactivation.

In other words, the invention provides that the activation or deactivation is artificially accelerated or slowed down such that an (external) additional magnetic force is applied and/or the current strength and/or the duration in which a specific current strength is applied is changed.

Advantageous embodiments are claimed in the dependent claims and will be explained below.

Thus, it is advantageous if the external additional magnetic force is supplied by a permanent magnet or an additional coil that can carry an electric current. By the additional magnetic force, an additional magnetic field is generated that influences, together with a magnetic field generated by the primary coil, the movements of the slide and the poppet and therefore the activation and deactivation times of the solenoid valve. In this way, the permanent magnet can be attached, for example, axially on an element of the solenoid valve to be moved, such as a slide and/or poppet or mounted on a housing of the solenoid valve. The use of a permanent magnet, however, is limited, because the magnetic field generated by it is not variable and cannot be deactivated. The additional coil/external coil preferably concentrically surrounds the primary coil provided for shifting the element to be moved.

Another advantageous embodiment simulates an advanced activation in that the peak current strength is increased and/or the charging current strength is increased and/or the charging phase is lengthened. Therefore, before the activation point in time, a larger electromagnetic energy is stored in the solenoid valve, whereby the slide and poppet can move more quickly at the activation point in time.

Another advantageous embodiment simulates a retarded activation in that the peak current strength is reduced and/or the charging current strength is reduced and/or the charging phase is shortened. Therefore, a low electromagnetic energy is stored in the solenoid valve, whereby the slide and poppet move more slowly at the activation point in time.

In addition, for simulating an advanced deactivation, it is advantageous if a magnetic field (secondary magnetic field) generated by the additional magnetic force has an opposite polarity than the magnetic field (primary magnetic field) generated by the primary coil. Therefore, the force of the primary magnetic field acting on the slide and poppet in a braking manner is weakened by the force of the secondary magnetic field acting in the opposite direction, which is why the slide and poppet move more quickly.

It is advantageous if, for simulating a retarded deactivation, the holding current strength is increased and/or the time offset between the deactivation point in time and the inductively caused rise in current strength is shortened. The increase of the holding current strength produces greater electromagnetic energy at the deactivation point in time, which brakes the movement of the slide and the poppet. Due to a shorter time offset between the deactivation point in time and the inductively caused increase of the current strength, the movement of the slide and poppet are already (additionally) slowed down at an advanced point in time.

Another advantageous embodiment is if, for simulating an advanced activation and for simulating a retarded deactivation, the permanent magnet is applied so that the secondary magnetic field generated by it has the same polarity as the primary magnetic field generated by the primary coil. For simulating a retarded activation and for simulating an advanced deactivation, the permanent magnet is applied so that the secondary magnetic field generated by it has the opposite polarity as the primary magnetic field generated by the primary coil. The same polarity of both magnetic fields causes an increase of the force acting on the slide and the poppet, whereas the resulting force is smaller due to the opposite polarities than the force resulting just from the primary magnetic field.

In addition, it is advantageous if, for simulating an advanced activation and for simulating a retarded deactivation, instead of the permanent magnet, an (external) additional coil is used that generates a secondary magnetic field with a polarity that is identical in comparison to the primary magnetic field. For simulating a retarded activation and for simulating an advanced deactivation, the (external) additional coil generates a secondary magnetic field with a polarity that is opposite in comparison to the primary magnetic field. For the use of a secondary magnetic field with the same polarity generated by an additional coil, it must be taken into account that advanced movement of the slide and poppet is not induced due to the resulting additional force.

BRIEF DESCRIPTION OF THE DRAWINGS

The invention will be explained in more detail below with the help of the drawings. Shown are.

The figures are merely of a schematic nature and are used only for understanding the invention. The same elements are provided with the same reference symbols.

DETAILED DESCRIPTION OF THE PREFERRED EMBODIMENTS

Figure 1:
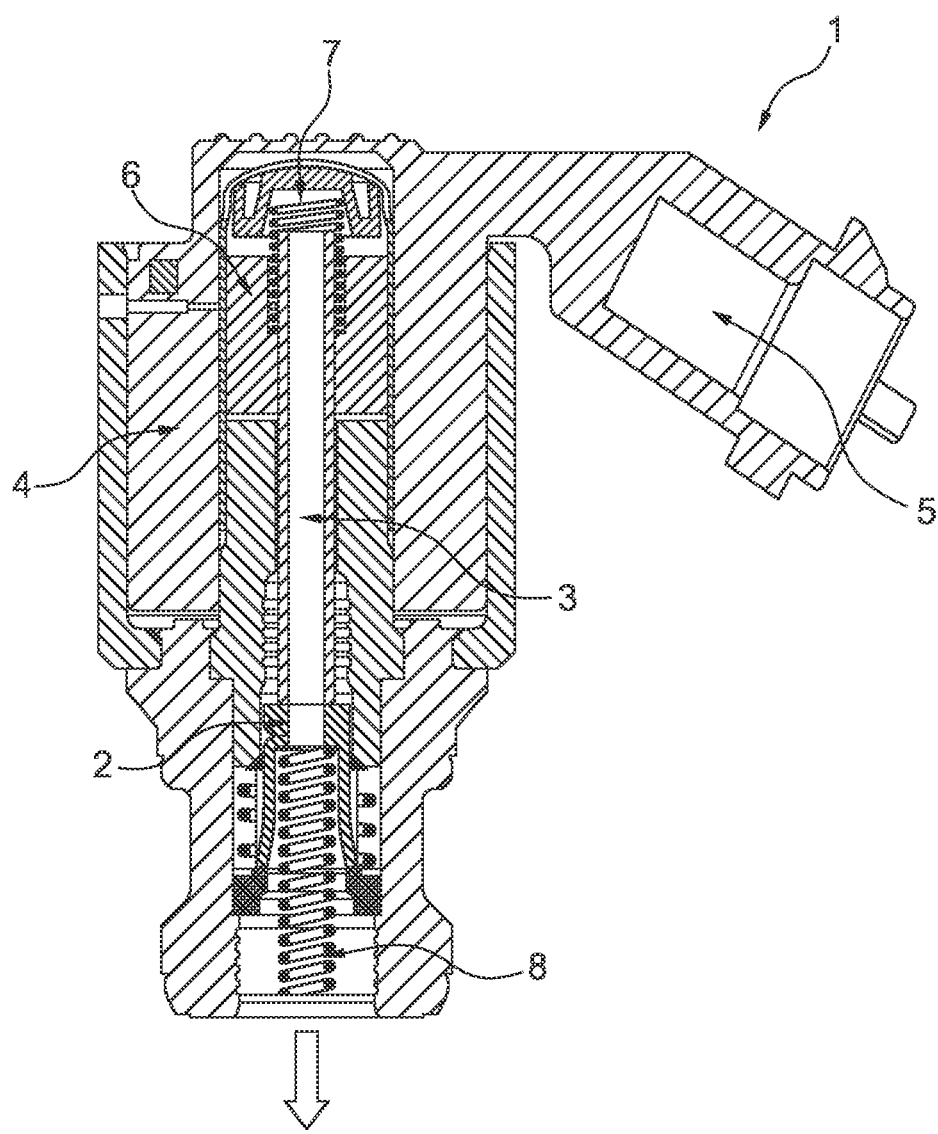
FIG. 1 a longitudinal sectional view of a conventional solenoid valve for illustrating the individual components, and FIG. 2 an example current strength profile for the switching (activation and deactivation) of a solenoid valve.

FIG. 1 shows a longitudinal sectional view of a conventional solenoid valve 1 with a poppet 2 that is arranged immovable in the axial and radial directions on a slide 3. The slide 3 is arranged between an upper, non-dominant spring 7 and a lower, dominant spring 8 and is surrounded in the radial direction by a primary coil 4 that is used for establishing an electromagnetic field. The primary coil 4 is connected to an electrical connection 5 for current feed. A magnetic armature 6 is arranged concentric to the slide 3 and abutting this slide.

The dominant spring 8 holds the valve open long enough until the sum from the force of the non-dominant spring 7 and the magnetic force generated by the magnetic field is greater than the force of the dominant spring 8 and the solenoid valve 1 closes. Thus, a "normally open" switching valve is shown. As soon as the current feed is cut or the current strength is reduced and the sum from the force of the non-dominant spring 7 and the magnetic force is smaller than the force of the dominant spring 8, the solenoid valve 1 is opened again.

Figure 2:
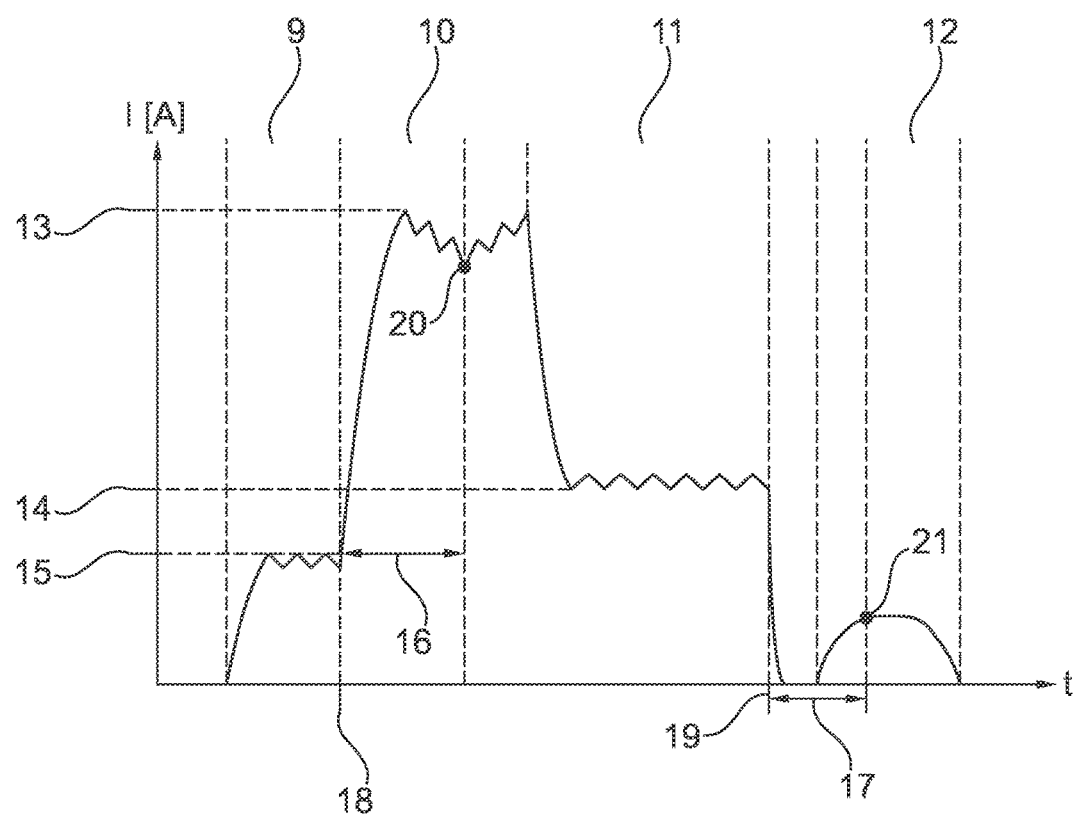

FIG. 2 shows an example current strength profile for the switching (activation and deactivation) of a solenoid valve 1. It shows the current strength I applied to the solenoid valve 1 with respect to time t.

The current strength profile includes four phases: a charging phase 9, a high phase 10, a holding phase 11, and a decay phase 12. The charging phase 9 begins with the start of the current feed to the primary coil 4.

During the charging phase 9, the current strength is increased up to a predetermined charging current strength 15 and held there to build up energy in the solenoid valve 1 without moving the slide 3 and poppet 2. This makes more consistent activation times 16 possible. The end of the charging phase 9 marks an activation point in time 18 at which the high phase 10 simultaneously begins and the current strength increases to a peak current strength 13 and is held there. The activation point in time 18 describes the point in time at which the closing of the solenoid valve 1 is started.

A low point 20 of a V-shaped current strength profile during the high phase 10 describes the end of the movement of the slide 3 and poppet 2, that is, slide 3 and poppet 2 have reached their end position. The end of the high phase 10 is the beginning of the holding phase 11 in which the current strength is reduced to a holding current strength 14 and is held there. The holding current strength 14 is here sufficiently high to hold the slide 3 and poppet 2 in their position. The holding phase 11 ends with a deactivation point in time 19, that is, with the cutting or reduction of the current feed at the electrical connection 5 and the beginning of the opening of the solenoid valve 1.

With a time offset at the end of the holding phase 11, the decay phase 12 begins in which the current strength increases again due to inductance and then falls again. At the end of the decay phase 12, a current strength can no longer be measured.

The period between the activation point in time 18 and the low point 20 of the current strength profile in the high phase 10 corresponds to the activation or activation time 16, whereas the duration between the deactivation point in time 19 and the point 21 (in the course of the current strength profile in the decay phase 12) at which the slide 3 and poppet 2 have reached the starting positions again corresponds to the deactivation or deactivation time 17.

REFERENCE NUMBERS

1 Solenoid valve
2 Poppet
3 Slide
4 Primary coil
5 Electrical connection
6 Magnetic armature
7 Upper/non-dominant spring
8 Lower/dominant spring
9 Charging phase
10 High phase
11 Holding phase
12 Decay phase
13 Peak current strength
14 Holding current strength
15 Charging current strength
16 Activation or activation time
17 Deactivation or deactivation time
18 Activation point in time
19 Deactivation point in time
20 Low point of a v-shaped current strength profile in the high phase
21 Point on a current strength profile in the decay phase

The invention claimed is:

1. A method for simulating malfunctioning solenoid valves for an internal combustion engine by influencing an activation time and a deactivation time of the solenoid valve, the method comprising:
energizing the solenoid valve with current of a predetermined, variable current strength for realizing opening and closing processes;
forcing the closing process after activation of a current feed to the solenoid valve at an activation point in time, and forcing the opening process after a deactivation of the current feed to the solenoid valve at a deactivation point in time;
before the activation point in time, applying the current with a charging current strength for a duration of a charging phase and starting from the activation point in time, increasing the current to a peak current strength and then reducing the current to a holding current strength; and
starting from the deactivation point in time, further reducing the current strength to a deactivation current strength,
wherein after a time offset, the current strength increases again due to inductance, and using at least one of a variation of a magnitude, a duration of the current strength, or application of an additional magnetic force for simulating at least one of an advanced activation, a retarded activation, an advanced deactivation, or a retarded deactivation.

2. The method according to claim 1, wherein for simulating the advanced activation, at least one of the peak current strength is increased, the charging current strength is increased, or the charging phase is lengthened.

3. The method according to claim 1, wherein for simulating the retarded activation, at least one of the peak current strength is reduced, the charging current strength is reduced, or the charging phase is shortened.

4. The method according to claim 1, wherein for simulating the advanced deactivation, a magnetic field generated by the additional magnetic force has an opposite polarity than a magnetic field generated by a primary coil.

5. The method according to claim 1, wherein for simulating the retarded deactivation, at least one of the holding current strength is increased or a time offset between the deactivation point in time and an inductively caused increase of the current strength is shortened.

6. The method according to claim 1, wherein the additional magnetic force is provided by a permanent magnet or an additional coil that carries an electric current.

7. The method according to claim 6, wherein the permanent magnet connects axially to an element of the solenoid valve to be moved or the additional coil surrounds a primary coil provided for shifting the element to be moved.

8. The method according to claim 6, wherein the permanent magnet is mounted on a housing of the solenoid valve.

9. The method according to claim 6, wherein for simulating the advanced activation and for simulating the retarded deactivation, the permanent magnet is applied so that a magnetic field generated thereby has a same polarity as a magnetic field generated by a primary coil or for simulating the retarded activation and for simulating the advanced deactivation, the permanent magnet is applied so that the magnetic field generated thereby has an opposite polarity as the magnetic field generated by the primary coil.

10. The method according to claim 6, wherein for simulating the advanced activation and for simulating the retarded deactivation, a magnetic field generated by the additional coil has a same polarity as a magnetic field generated by a primary coil or for simulating the retarded activation and for simulating the advanced deactivation, the magnetic field generated by the additional coil has an opposite polarity as the magnetic field generated by the primary coil.

* * * * *